C. J. NASH.
DRAFT GEAR YOKE.
APPLICATION FILED SEPT. 18, 1915.

1,196,971.

Patented Sept. 5, 1916.

Inventor:
Charles J. Nash
By Gillson & Gillson
Attys.

UNITED STATES PATENT OFFICE.

CHARLES J. NASH, OF CHICAGO, ILLINOIS, ASSIGNOR TO UNIVERSAL DRAFT GEAR ATTACHMENT CO., OF CHICAGO, ILLINOIS, A CORPORATION OF ILLINOIS.

DRAFT-GEAR YOKE.

1,196,971.

Specification of Letters Patent.

Patented Sept. 5, 1916.

Application filed September 18, 1915. Serial No. 51,365.

*To all whom it may concern:*

Be it known that I, CHARLES J. NASH, a citizen of the United States, and resident of Chicago, county of Cook, and State of Illinois, have invented certain new and useful Improvements in Draft-Gear Yokes, of which the following is a specification, and which are illustrated in the accompanying drawings, forming a part thereof.

The invention relates to draft gear yokes and more particularly to those which are constructed for detachable connection with the coupler and provide for a sliding movement of the coupler butt within the yoke. Draft gear yokes of this type are more especially intended for use in connection with shock absorbing mechanism which is required to be assembled within the yoke before being applied to the car. It is therefore important that the yoke and coupler butt may be readily connected after the yoke and contained shock absorbing mechanism have been applied to the car and that the form of connection shall be such as to possess the requisite strength for withstanding the pulling stresses and to afford ample resistance against wear incident to the relative sliding movement of the coupler butt and yoke in buffing.

The object of the invention is to provide a draft yoke of the type described and of improved construction having increased strength and resistance against wear and insuring that the yoke and coupler may be easily connected or disconnected.

Figure 1:
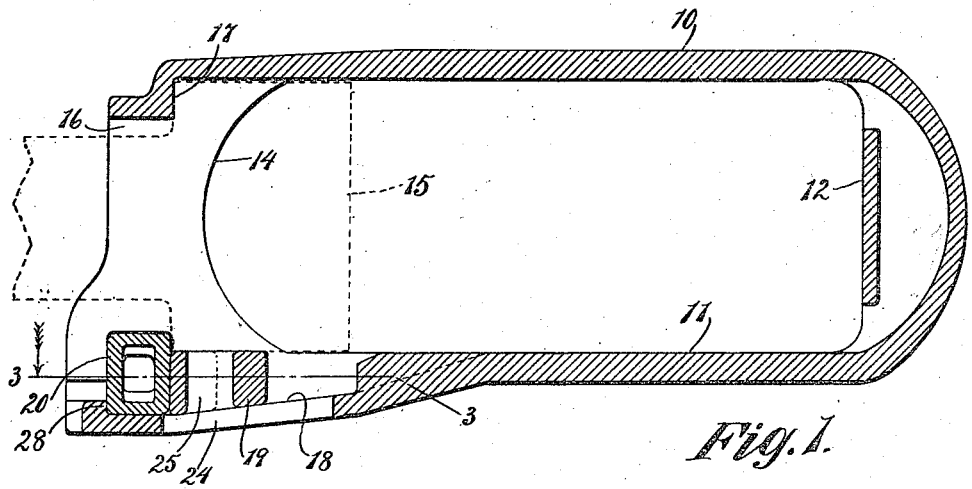
Figure 2:
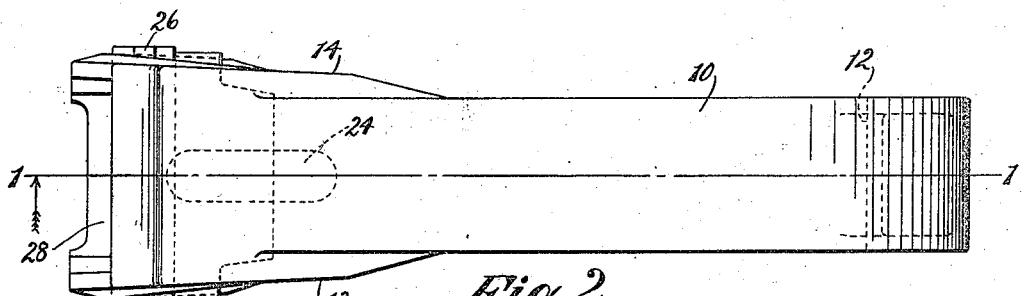
Figure 3:
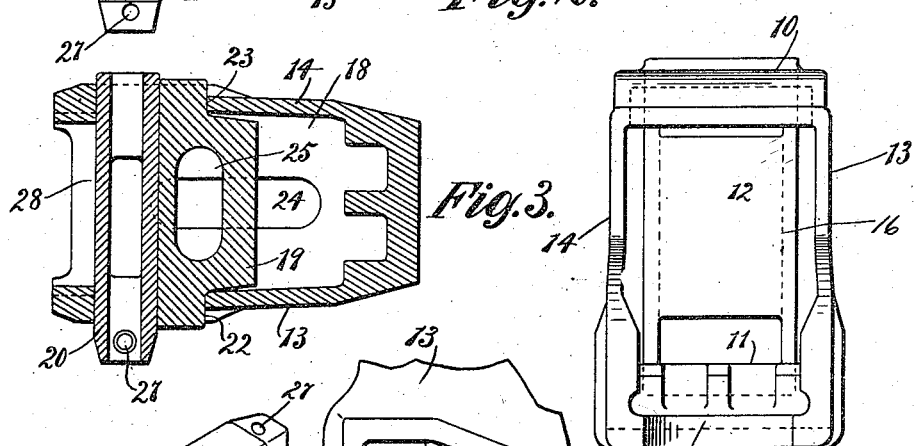
Figure 4:
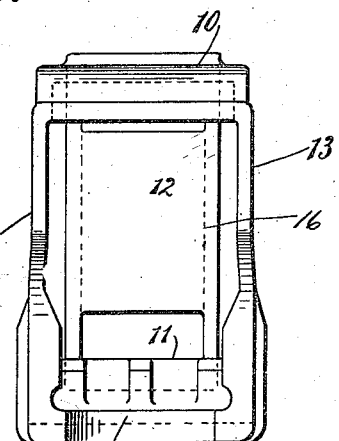
Figures 5, 6:
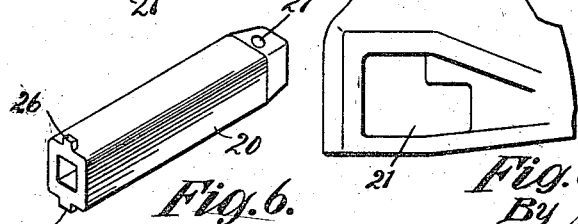

In the accompanying drawings, Figure 1 is a central longitudinal sectional view through the yoke, the position of the coupler butt when connected therewith being indicated by dotted lines; Fig. 2 is a plan view of the yoke; Fig. 3 is a plan sectional view taken on the line 3—3 of Fig. 1; Fig. 4 is a front end view of the yoke; Fig. 5 is a detail side view of the yoke with some of the parts removed, and Fig. 6 is a perspective view showing a key which is employed in making the connection between the yoke and the coupler butt.

The body portion of the yoke will usually comprise the upper and lower straps 10 and 11 for extending above and below the shock absorbing elements (not shown). These straps are connected at their rear ends to provide a rear follower engaging portion 12. At their forward ends, the upper and lower straps 10, 11, are connected by side plates 13, 14, forming a socket 16 for receiving the coupler butt, as 15.

The upper strap 10 is depressed at its extreme forward end to form a depending draft shoulder 17 for engagement with the upper part of the coupler butt. The lower strap 11, on the other hand, is depressed throughout all that part of its forward end portion which extends between the side plates 13, 14, thereby providing the socket 16 with an inclined floor plate 18 upon which the coupler butt 15 may slide while being introduced into the socket, in lowered position, to clear the shoulder 17.

When the coupler butt 15 has been introduced it is secured in place by means of a shim 19 and key 20. These parts are successively introduced through openings 21 in side plates 13, 14, the shim 19 being entered first. As the shim 19 is wider than the key 20 and the key is thicker than the shim, the openings 21 are of angular shape, to permit the entrance of both of these parts.

The purpose of the shim 19 is to support the coupler butt 15 in elevated position for the engagement of its upper portion with the draft shoulder 17. It also serves as a wear plate upon which the coupler butt slides during its independent movement with reference to the yoke. In order that it may present a horizontal upper surface, the under side of the shim is beveled to rest upon the inclined floor plate 18 of the socket 16. The insertion of the key 20 through the openings 21, after the insertion of the shim 19 is permitted by making the two end portions of the shim of reduced width, as indicated at 22, 23, and by moving the shim backwardly beneath the coupler butt when it reaches a central position with reference to the yoke. The reduced end portions 22, 23, of the shim and the key 20, then serve to completely fill the openings 21. The manipulation of the shim incident to its insertion and withdrawal are facilitated if the floor plate 18 is apertured, as indicated at 24, and an aperture 25 is formed in the shim.

The key 20 is of rectangular shape in cross section and provides an abrupt draft shoulder for engagement with the lower portion of the coupler butt. To prevent longitudinal displacement of the key, lugs 26 are formed thereon adjacent one end and the other end of the key is provided with openings 27 for receiving a cotter (not shown). If desired, the key may be made of reduced weight by being formed hollow, and the bending of the key by draft stresses is prevented by providing an upstanding lug 28 upon the floor plate 18 in front of the key. It will be understood that this lug is only to be of such height that it will permit of the coupler butt clearing the draft shoulder 17 when the key 20 and shim 19 are removed.

The construction provides that while the key 20 receives the forward thrust of the coupler butt, all of the wear incident to the sliding movement of the coupler butt with reference to the yoke is confined to the shim 19. This part is readily renewed without removing the yoke from the car, or dislodging the shock-absorbing elements. Furthermore, the construction provides a connection of the coupler with the yoke of ample strength to withstand the draft stresses.

I claim as my invention—

1. A yoke having a four-sided butt-receiving socket at its forward end with a butt-retaining shoulder extending across the top wall of the socket and alined angular openings in the two upright walls of the socket near its floor plate, the height of the socket being greater than the depth of the coupler butt, a shim constructed to be entered through the opening in one of the upright walls of the socket to support the coupler butt in elevated position within the socket, the length of the shim being as great as the external width of the socket and the width of the shim intermediate its ends being substantially equal to the greatest width of the said opening through which it is entered, the ends of the shim being of less width by an amount equal to the width of the narrower part of said opening, and a key of greater depth than the shim extending through the socket and the said openings in front of the shim.

2. A yoke having a four-sided butt-receiving socket at its forward end with a butt-retaining shoulder extending across the top wall of the socket and alined openings in the two upright walls of the socket near its floor plate, the height of the socket being greater than the depth of the coupler butt, a key extending transversely through the socket and the said openings to provide a butt-retaining shoulder on the floor plate of the socket, and a supporting lug rising from the floor plate of the socket in front of the key.

3. A yoke having a four-sided butt-receiving socket at its forward end with a butt-retaining shoulder extending across the top wall of the socket and alined openings in the two upright walls of the socket near its floor plate, a removable coupler butt engaging member extending transversely through the socket and the said openings, the floor plate of the socket and the said coupler butt engaging member both being centrally apertured.

CHARLES J. NASH.